United States Patent
Depta et al.

(10) Patent No.: US 11,913,630 B2
(45) Date of Patent: Feb. 27, 2024

(54) AIRCRAFT HEADLIGHT, AIRCRAFT COMPRISING AN AIRCRAFT HEADLIGHT, AND METHOD OF HEATING A LIGHT TRANSMISSIVE COVER OF AN AIRCRAFT HEADLIGHT

(71) Applicant: Goodrich Lighting Systems Gmbh & Co. KG, Lippstadt (DE)

(72) Inventors: Marion Depta, Lippstadt (DE); Anil Kumar Jha, Lippstadt (DE); Robert Trinschek, Hamm (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/973,863

(22) Filed: Oct. 26, 2022

(65) Prior Publication Data
US 2023/0139661 A1    May 4, 2023

(30) Foreign Application Priority Data
Oct. 29, 2021 (EP) .................................... 21205648

(51) Int. Cl.
| | |
|---|---|
| *F21S 45/60* | (2018.01) |
| *F21V 29/90* | (2015.01) |
| *B64D 47/04* | (2006.01) |
| *F21V 29/10* | (2015.01) |
| *F21W 107/30* | (2018.01) |

(52) U.S. Cl.
CPC .............. *F21V 29/10* (2015.01); *B64D 47/04* (2013.01); *F21W 2107/30* (2018.01)

(58) Field of Classification Search
CPC .......... F21S 45/60; F21V 29/90; B64D 47/04; B64D 47/06
See application file for complete search history.

(56) References Cited

U.S. PATENT DOCUMENTS

| | | | |
|---|---|---|---|
| 8,563,898 | B1 | 10/2013 | Wright et al. |
| 10,393,340 | B1 | 8/2019 | Zhang |
| 2013/0249375 | A1 | 9/2013 | Panagotacos et al. |
| 2018/0242403 | A1 | 8/2018 | Weissenberger et al. |
| 2019/0271450 | A1 | 9/2019 | Dallos, Jr. et al. |
| 2021/0388966 | A1 * | 12/2021 | Ruan ...................... F21S 41/285 |

FOREIGN PATENT DOCUMENTS

CN    111189036 A    5/2020

OTHER PUBLICATIONS

Abstract for CN111189036 (A), Published: May 22, 2020, 1 page.
Extended European Search Report for Application No. 21205648.5, dated Mar. 25, 2022, 7 pages.

* cited by examiner

*Primary Examiner* — Sean P Gramling
(74) *Attorney, Agent, or Firm* — CANTOR COLBURN LLP

(57) ABSTRACT

Aircraft headlight includes at least one light source; and a light transmissive cover, at least partially covering the at least one light source. The light transmissive cover includes a first layer made of a first material; a second layer made of a second material, which differs from the first material; and at least one electric heating wire for heating the light transmissive cover by passing an electric current through the electric heating wire. The at least one electric heating wire is embedded into the first layer.

15 Claims, 5 Drawing Sheets

AIRCRAFT HEADLIGHT, AIRCRAFT COMPRISING AN AIRCRAFT HEADLIGHT, AND METHOD OF HEATING A LIGHT TRANSMISSIVE COVER OF AN AIRCRAFT HEADLIGHT

CROSS-REFERENCE TO RELATED APPLICATIONS

This application claims priority to European Patent Application No. 21205648.5 filed Oct. 29, 2021, the entire contents of which is incorporated herein by reference.

TECHNICAL FIELD

The present invention is in the field of exterior aircraft lights. The present invention is in particular related to an aircraft headlight, to an aircraft comprising such an aircraft headlight, and to a method of heating a light transmissive cover of an aircraft headlight.

BACKGROUND

Almost all aircraft are equipped with exterior aircraft lights. In particular, large passenger air planes have a wide variety of exterior aircraft lights. Examples of such exterior aircraft lights include aircraft headlights, such as take-off lights, landing lights, taxi lights, and/or runway turn-off lights.

Low ambient temperatures may result in ice forming on the exterior surfaces of such exterior aircraft lights. Ice forming on a light emission surface of an exterior aircraft light may cause a deterioration of the light output provided by the exterior aircraft light. This may result in unsafe conditions due to an insufficient illumination of areas in front of and/or next to the aircraft. This problem becomes even more prominent when LEDs are employed as light sources, as the operation of LEDs generates less heat, which may be used for melting ice formed on the exterior surface of exterior aircraft lights, than the operation of halogen light sources, which have been used in the past.

It therefore would be beneficial to provide an exterior aircraft light which allows for removing ice in a fast and reliable manner, while having a low or negligible impact on the light output provided by the exterior aircraft light.

SUMMARY

Exemplary embodiments of the invention include an aircraft headlight comprising at least one light source and a light transmissive cover. The light transmissive cover at least partially covers the at least one light source. When the at least one light source is activated for emitting light, at least a substantial portion of the light emitted by the at least one light source passes the light transmissive cover. Light from the at least one light source may in particular pass the light transmissive cover in a direction which is oriented substantially orthogonal with respect to the extension of the light transmissive cover.

The light transmissive cover comprises a first layer made of a first material; a second layer made of a second material, which differs from the first material; and at least one electric heating wire, which is embedded into the first layer. The at least one electric heating wire allows for heating the light transmissive cover by passing an electric current through the at least one electric heating wire.

Exemplary embodiments of the invention also include an aircraft comprising at least one aircraft headlight according to an exemplary embodiment of the invention. Such aircraft may be an air plane or a helicopter.

The at least one aircraft headlight may be mounted to a fuselage or to a landing gear or to a wing, in particular to a wing root, of the aircraft.

Exemplary embodiments of the invention further include a method of heating the light transmissive cover of an aircraft headlight according to an exemplary embodiment of the invention by passing an electric current through the at least one electric heating wire.

In an aircraft headlight according to an exemplary embodiment of the invention, the light transmissive cover may be heated by passing an electric current through the at least one electric heating wire. The heat may be used for melting ice, which has formed on the light transmissive cover. The heat generated by the at least one electric heating wire may further prevent the formation of new ice on the light transmissive cover.

As a result, an aircraft headlight according to an exemplary embodiment of the invention may allow for providing an aircraft headlight having a light transmissive cover which is free of ice in a large range of operating conditions and/or very shortly after starting to pass electric current through the at least one electric heating wire.

An aircraft headlight according to an exemplary embodiment of the invention may in particular allow for a fast deicing of the areas that contribute most to the light output of the aircraft headlight. This may result in a better illumination of the area(s) in front of the aircraft, resulting in better visibility conditions for the pilots in flight, during landing and on the ground.

An aircraft headlight according to an exemplary embodiment of the invention may obviate the need for anti-icing fluids, which need additional processing steps of being applied and which might degrade the cover, the electronics and/or the optical components of the aircraft headlight.

In an aircraft headlight according to an exemplary embodiment of the invention, heat is generated only when it is needed. In consequence, mechanical stresses on components, which are caused by temperature changes, may be reduced.

By being embedded into the first layer, the at least one electric heating wire is fixed in position with respect to the light transmissive cover, is protected from adverse influences by the surrounding first layer, and is able to distribute heat into the volume of the first layer in a highly efficient manner.

In an embodiment, the at least one light source is or comprises at least one LED.

In an embodiment, the first layer is arranged on a side of the light transmissive cover facing the at least one light source; and the second layer is arranged on an opposite side facing away from the at least one light source. In such an embodiment, the at least one electric heating wire, which is provided within the first layer, is protected not only by the first layer, into which it is embedded, but also by the second layer from adverse external influences. The second layer may in particular provide additional protection from mechanical impact during flight.

In an embodiment, the first and second layers are substantially co-extensive. I.e., the first layer may cover the surface of the second layer facing the at least one light source substantially completely, and the second layer may cover the surface of the first layer facing away from the at least one light source substantially completely. In other words, it is possible that there are no substantial portions of one of the first and second layers, which are not covered by a portion of the other layer, respectively.

In an embodiment, the first layer is attached to the second layer.

The first and second layers may be attached to each other by means of an adhesive. Alternatively or additionally, at least one of the first and second layers may be made from a material which sticks to the other layer.

The first material, for example, may be brought into a liquid state and may be distributed over the second layer for forming the first layer.

In an embodiment, the first layer is formed by casting the first material around the at least one electric heating wire or by overmolding the first material around the at least one electric heating wire. The first material may in particular be cast/overmolded at temperatures above 150° C., in particular at temperatures between 150° C. and 200° C. The first layer may be cast/molded as a stand alone component or may be cast/molded onto the second layer.

In an embodiment, the first material has a higher thermal conductivity than the second material. A first material having a high thermal conductivity may allow for transferring the heat, generated by the at least one electric heating wire, efficiently to the second layer for quickly melting and removing ice from said second layer. It is also possible that the first and second materials have comparable/similar thermal conductivities or that the second material has a higher thermal conductivity than the first material. In any case, with the at least one electric heating wire being embedded into the first layer, the heat from the at least one electric heating wire may be efficiently introduced into and distributed within the volume of the first layer, thus contributing to an efficient heating of the second layer.

In an embodiment, the first material is softer than the second material. A soft first material may facilitate a particularly good embedding of the at least one electric heating wire into the first layer. Using a harder second material for forming the second layer may result in a second layer which provides good resistance and protection against adverse environmental influences, in particular against mechanical environmental influences, such as impacts.

During production, the first material may be softened or liquefied by heating the first material, in order to facilitate processing the first material. The softened/liquefied state of the first material may in particular facilitate introducing the at least one electric heating wire into the first layer and/or attaching the first layer to the second layer in a particularly effective manner, e.g. by casting or molding the first layer onto the second layer and/or around the at least one electric heating wire.

In an embodiment, the first material comprises at least one of silicone and polycarbonate.

In an embodiment, the second material comprises at least one of glass and plastic, such as PMMA.

These materials have been found as well-suited for providing the first and second layers of the light transmissive cover, respectively.

In an embodiment, the aircraft headlight comprises at least one optical element, in particular at least one of a lens and a reflector, for forming a targeted light output from the light emitted by the at least one light source. By forming a targeted light output from the light emitted by the at least one light source, a high efficiency of the aircraft headlight may be achieved.

In an embodiment, the aircraft headlight comprises more than one light source, and an optical element or a group of optical elements, in particular a group of optical elements comprising a reflector and a lens, is assigned to each of the light sources, respectively. In such a configuration, each optical element or each group of optical elements may be configured for forming a portion of the targeted light output from the light emitted by the respectively assigned light source.

In another embodiment, an optical element or a group of optical elements is collectively assigned to a plurality of the light sources. The aircraft headlight may comprise a plurality of groups of light sources, and each group may comprise a plurality of light sources, respectively. An optical element or a group of optical elements may be assigned to each of the plurality of groups of light sources, respectively.

In yet another embodiment a single optical element or a group of optical elements may be collectively assigned to all light sources of the aircraft headlight.

In an embodiment, at least one optical element is formed on or within the light transmissive cover. The at least one additional optical element may be formed on the side of the light transmissive cover facing the at least one light source and/or on the side of the light transmissive cover facing away from the at least one light source. The at least one additional optical element may in particular be formed on or within any of the first and second layers.

The at least one additional optical element may in particular be formed by or within the first layer facing the at least one light source.

In an embodiment, the at least one additional optical element is formed by or within a third layer, which is formed on the side of the first layer facing the at least one light source. In such a configuration, the first layer may be sandwiched between the second layer and the third layer.

In an embodiment, the aircraft headlight comprises a plurality of light emission units. Each of the plurality of light emission units may comprise at least one unit-specific light source and at least one unit-specific optical element, respectively. The plurality of light emission units may be arranged in a side-by-side configuration. The at least one electric heating wire may extend at least partially between the plurality of light emission units, when projected onto the light transmissive cover, and/or along a projection of the border portions of the plurality of light emission units onto the light transmissive cover.

The border portions of the plurality of light emission units may be formed by the outer periphery of unit-specific optical elements, in particular by the outer periphery of unit-specific reflectors, and the at least one electric heating wire may extend at least along one or more portions of the projection of said outer periphery onto the light transmissive cover.

The at least one electric heating wire may in particular extend along a substantial portion of said projection. The at least one electric heating wire may also extend basically along the complete projection.

Such a configuration of the at least one electric heating wire may allow for a highly uniform heating of the light transmissive cover, while having no or only a very low impact on the amount of light emitted by the aircraft headlight.

In an embodiment, the at least one electric heating wire extends along a meander shaped path through the first layer. An electric heating wire, which extends along a meander shaped path through the first layer, may allow for a uniform heating of the light transmissive cover, while having no or only a very low impact on the amount of light emitted by the aircraft headlight.

In an embodiment, the at least one electric heating wire has a thickness in the range from 0.05 mm to 0.5 mm. The at least one electric heating wire may in particular have a thickness in the range from 0.1 mm to 0.3 mm. More particularly, the at least one electric heating wire may have a thickness in the range from 0.15 mm to 0.25 mm.

In an embodiment, the aircraft headlight further comprises at least one temperature sensor for detecting a temperature at or within the aircraft headlight.

In an embodiment, the at least one electric heating wire itself is employed as a temperature sensor.

In an embodiment, the aircraft headlight further comprises a controller for selectively activating and/or deactivating an electric current passing through the at least one electric heating wire. The controller may be configured for selectively activating and/or deactivating the electric current passing through the at least one electric heating wire based on the temperature detected by the at least one temperature sensor.

In an embodiment, the at least one temperature sensor is in contact with the light transmissive cover for detecting the temperature of the light transmissive cover.

In an embodiment, at least one temperature sensor is arranged inside the aircraft headlight and/or outside the aircraft headlight for detecting the temperature within and/or outside the aircraft headlight.

In an embodiment, the controller is configured for activating the at least one electric heating wire when the temperature detected by the at least one temperature sensor is below a predetermined lower temperature threshold. The lower temperature threshold may be between of 0° C. and +5° C., in particular between +1° C. and +3° C., more particularly between +1.5° C. and +2.5° C.

In an embodiment, a method of heating the light transmissive cover of an aircraft headlight according to an exemplary embodiment of the invention includes: detecting a temperature at or within the aircraft headlight, and selectively activating and deactivating the electric current, passing through the at least one electric heating wire, based on the detected temperature.

In an embodiment, the method includes activating the electric current, passing through the at least one electric heating wire, when the detected temperature is below a predefined lower threshold, for example a predefined lower threshold of between 0° C. and +5° C., in particular between +1° C. and +3° C., more particularly between +1.5° C. and +2.5° C.

Such a configuration may allow for activating the at least one electric heating wire when the detected temperature is slightly above or below the freezing point, in order to avoid the formation of ice on the light transmissive cover and/or in order to melt ice, which already formed on the light transmissive cover.

In an embodiment, the controller is configured for deactivating the at least one electric heating wire when the temperature detected by the at least one temperature sensor exceeds a predetermined upper temperature threshold. The upper temperature threshold may be between +10° C. and +30° C., in particular between +15° C. and +25° C., more particularly between +19° C. and +21° C.

In an embodiment, the method includes deactivating the electric current, passing through the at least one electric heating wire, when the detected temperature exceeds a predefined upper threshold, for example a predefined upper threshold of between +10° C. and +30° C., in particular between +15° C. and +25° C., more particularly between +19° C. and +21° C.

Deactivating the at least one electric heating wire, when the temperature detected by the at least one temperature sensor exceeds a predetermined upper temperature threshold, may avoid an unnecessary operation of the at least one electric heating wire in situation in which there is no risk of ice-formation on the light transmissive cover.

In an alternative embodiment, the controller may include a timer, which is started when the at least one electric heating wire is activated, and the at least one electric heating wire may be deactivated after a predefined time period has expired.

BRIEF DESCRIPTION OF DRAWINGS

Further exemplary embodiments of the invention are described below with respect to the accompanying drawings, wherein.

DETAILED DESCRIPTION

Figure 1:
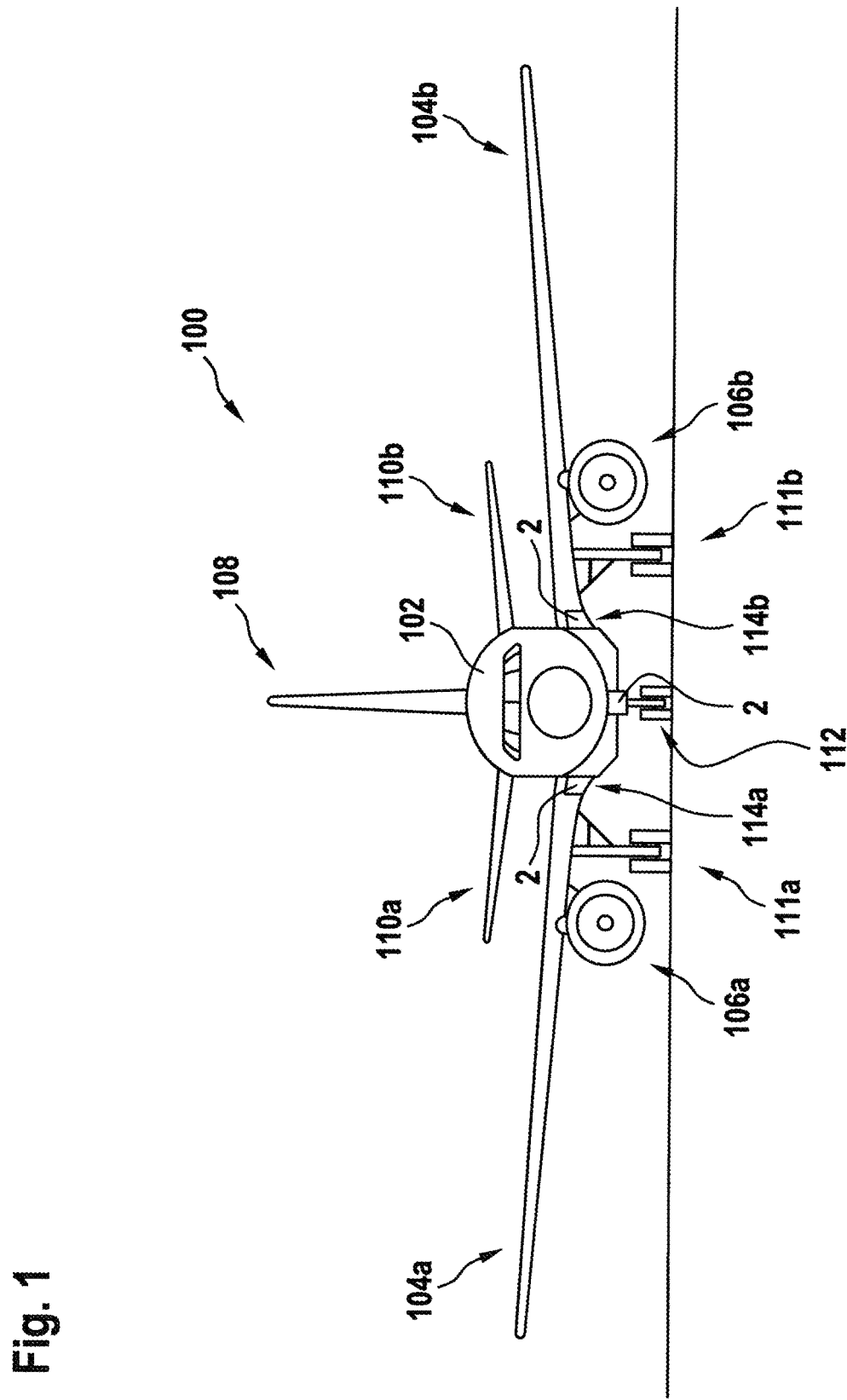
FIG. 1 shows a schematic front view of an aircraft in accordance with an exemplary embodiment of the invention.

FIG. 1 depicts a schematic front view of an aircraft 100, comprising three aircraft headlights 2 in accordance with exemplary embodiments of the invention.

The aircraft 100 has a fuselage 102 and two wings 104a, 104b, extending laterally from the right and left sides of the fuselage 102. Each of the wings 104a, 104b supports an engine 106a, 106b. In further exemplary embodiments, which are not depicted in the figures, each of the wings 104a, 104b may support more than one engine 106a, 106b, each of the wings 104a, 104b may in particular support two engines 106a, 106b, respectively. In further embodiments, one or more engines 106a, 106b may be mounted to the fuselage 102 as well.

A vertical stabilizer 108 and two horizontal stabilizers 110a, 110b are mounted to a tail portion of the fuselage 102.

The aircraft 100 further comprises a landing gear configuration, including two main gears 111a, 111b, which are arranged under the wings 104a, 104b, and a front gear 112, which is located under a front portion of the fuselage 102. Other landing gear configurations, in particular landing gear configurations comprising more than two main gears 111a, 111b, are possible as well.

An aircraft headlight 2 is mounted to the front gear 112. Additional aircraft headlights 2 are provided at the roots 114a, 114b of the wings 104a, 104b next to the fuselage 102.

Each of the aircraft headlights 2 may be an aircraft take-off light, an aircraft landing light, an aircraft taxi light, a runway turn-off light, or a multi-functional light combining at least two functionalities of an aircraft take-off light, an aircraft landing light, an aircraft taxi light, and a runway turn-off light.

The aircraft headlight configuration, depicted in FIG. 1, is only exemplary and not limiting. In other words, other aircraft headlight configurations, comprising at least one aircraft headlight 2, are possible as well. Aircraft headlights 2 may also be mounted to other components of the aircraft 100.

The aircraft 100 shown in FIG. 1 is an air plane 100, in particular a large commercial passenger or cargo air plane 100. It is pointed out that other types of aircraft, such as smaller air planes 100, may be equipped with aircraft headlights 2 in accordance with exemplary embodiments of the invention as well. Aircraft headlights 2 according to exemplary embodiments of the invention may be mounted to helicopters as well.

Figure 2:
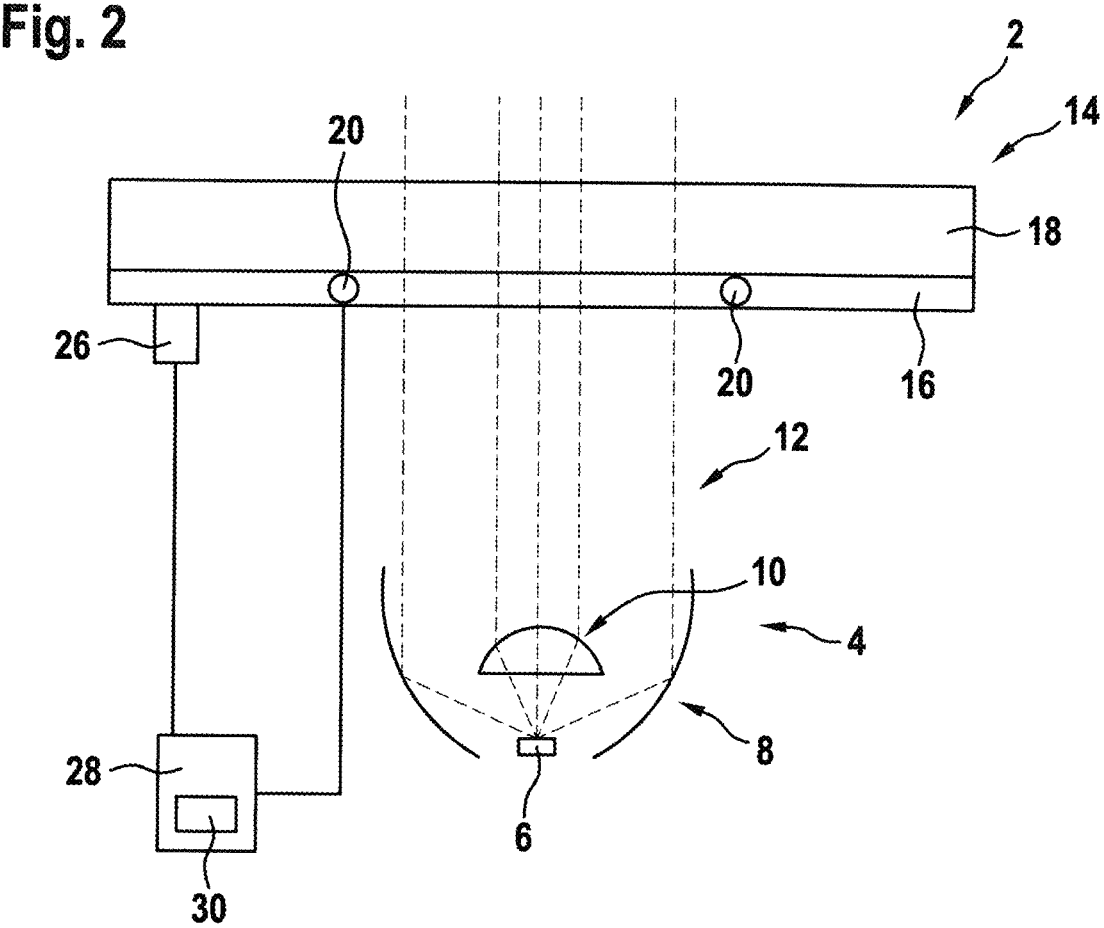
FIG. 2 shows a schematic cross-sectional view through an aircraft headlight according to an exemplary embodiment of the invention.

FIG. 2 shows a schematic cross-sectional view through an aircraft headlight 2 according to an exemplary embodiment of the invention.

The aircraft headlight 2 comprises a light emission unit 4, comprising a light source 6 and an optical element 8, in particular a reflector 8 surrounding the light source 6. The light source 6 may be an LED, or it may include one or more LEDs.

The light emission unit 4 further comprises another optical element 10, such as a lens 10. The optical elements 8, 10 form a targeted light output 12 from the light emitted by the light source 6. While the light output of the light emission unit 4 is shown as a collimated light output, it is stressed that such collimated light output is possible, but not required. It is also possible that the light emission unit 4 has a more distributed light output. In particular, the light output may be more targeted than the wide light emission of the light source 6, but not fully collimated as exemplarily depicted in FIG. 2.

Although only a single light emission unit 4 is depicted in FIG. 2, an aircraft headlight 2 according to an exemplary embodiment of the invention may comprise a plurality of light emission units 4. Examples of aircraft headlights 2 including a plurality of light emission units 4 will be discussed further below.

The aircraft headlight 2 further comprises a light transmissive cover 14, which covers the light emission unit 4, in order to protect the light emission unit 4 from adverse environmental influences such as water, dirt, and mechanical impact.

The light transmissive cover 14 includes two layers 16, 18, namely a first, inner layer 16, facing towards the light emission unit 4, and a second, outer layer 18 facing away from the light emission unit 4 towards the outside of the aircraft headlight 2.

At least a large portion of the targeted light output 12 passes the first and second layers 16, 18 of the light transmissive cover 14. In particular, a large portion of the light output 12 passed the light transmissive cover 14 in a substantially orthogonal direction with respect to main plane of extension of the light transmissive cover 14. While such passing of light through the light transmissive cover 14 in a substantially orthogonal direction may be desired, it is also possible to pass the light through the light transmissive cover 14 at different angles.

In particular, the light output 12 first passes the first, inner layer 16, facing towards the light emission unit 4, and then passes the second, outer layer 16, which faces towards the outside of the aircraft headlight 2.

The first layer 16 is made of a first material, and the second layer 18 is made of a second material, which differs from the first material. Both materials are light transmissive, in order to allow the targeted light output 12 to pass through the first and second layers 16, 18. Both the first and second materials may be transparent or substantially transparent.

The first and second layers 16, 18 are attached to each other.

The first and second layers 16, 18 may be attached to each other by means of an adhesive. Alternatively or additionally, at least one of the first and second layers 16, 18 may be made from a material which sticks to the other layer 18, 16.

The first material, for example, may be liquefied by heating, and the liquefied first material may be distributed over the second layer 18 for forming the first layer 16.

The light transmissive cover 14 further comprises at least one electric heating wire 20, which is embedded into the first layer 16. The at least one electric heating wire 20 may be heated by passing an electric current therethrough. In consequence, the light transmissive cover 14 may be heated by passing an electric current through the at least one electric heating wire 20 for melting ice, which has formed on the light transmissive cover 14, in particular on the second, outer layer 18 of the light transmissive cover 14. Heating the electric heating wire 20 may further prevent the formation of ice on the light transmissive cover 14.

In an aircraft headlight 2 according to an exemplary embodiment of the invention, the first and second materials have different physical properties.

The second material, from which the second layer 18 is made, may in particular be a relatively hard material, i.e. a material which has a larger mechanical strength than the second material. In consequence, the second layer may provide good protection from mechanical impact. Using a relatively hard second material for forming the second layer 18 may provide for low wear of the second layer 18 caused by environmental influences, such as dirt hitting the second layer 18 during flight of the aircraft 100.

The first material, from which the first layer 16 is made, may be softer than the second material, as the first layer 16 is mechanically protected by the second layer 18. The first material may in particular be softer than the second material, in order to facilitate embedding of the at least one electric heating wire 20 into the second layer 18 in a convenient and effective manner.

For embedding the at least one electric heating wire 20 into the first material, the first material may be cast or overmolded around the at least one electric heating wire 20.

The first material may have a relatively high thermal conductivity, in order to allow for efficiently distributing heat within the first material and for efficiently heating the light transmissive cover 14 by passing an electric current through the at least one electric heating wire 20. The first material may be silicone and may have a thermal conductivity of 0.15 to 0.3 W/(m*K).

The first material may comprise at least one of silicone and polycarbonate. The second material may comprise at least one of glass and plastic, such as PMMA. These materials have been found as well-suited for forming the first and second layers, respectively.

The aircraft headlight 2 also comprises a controller 28 for controlling the operation of the at least one electric heating wire 20 and at least one temperature sensor 26 for detecting a temperature. The at least one temperature sensor 26 may be in contact with the light transmissive cover 14 for detecting the temperature of the light transmissive cover 14. In alternative configurations, the at least one temperature sensor 26 may be arranged within the aircraft headlight 2 or outside the aircraft headlight 2 for detecting the temperature within or outside the aircraft headlight 2, respectively.

In an alternative embodiment, the electric heating wire 20 itself is employed as a temperature sensor 26 by detecting changes of the electric resistance of the electric heating wire 20, which are caused by temperature changes.

The controller 28 may be configured for controlling the operation of the at least one electric heating wire 20 based on at least one temperature detected by the at least one temperature sensor 26.

The controller 28 may in particular be configured for activating the electric heating wire 20 by causing an electric current to pass through the electric heating wire 20 when the temperature detected by the at least one temperature sensor 26 is below a predetermined lower temperature threshold Tim. The lower temperature threshold $T_{low}$ may be between of 0° C. and +5° C., in particular between +1° C. and +3° C., more particularly between +1.5° C. and +2.5° C. Setting the lower temperature threshold Tim in one of these ranges results in activating the electric heating wire 20 when the detected temperature is slightly above or at the freezing point, in order to avoid the formation of ice on the light transmissive cover 14 and/or to melt ice, which has already formed on the light transmissive cover 14.

The controller 28 may further be configured for deactivating the electric heating wire 20 by switching off the electric current passing through the electric heating wire 20, when the temperature detected by the at least one temperature sensor 26 exceeds a predetermined upper temperature threshold Tup. The upper temperature threshold Tup may be between of +10° C. and +30° C., in particular between +15° C. and +25° C., more particularly between +19° C. and +21° C.

Deactivating the electric heating wire 20, when the temperature detected by the at least one temperature sensor 26 exceeds a predetermined upper temperature threshold Tup, may avoid an unnecessary operation of the electric heating wire 20 in situations in which there is no risk of ice forming on the light transmissive cover 14.

As described, the upper temperature threshold Tup may be above the lower temperature threshold $T_{low}$ resulting in a hysteresis between activating and deactivating the electric heating wire 20. Such a hysteresis may help to ensure that all ice formed on the light transmissive cover 14 is melted, before the electric heating wire 20 is deactivated.

Figure 3:
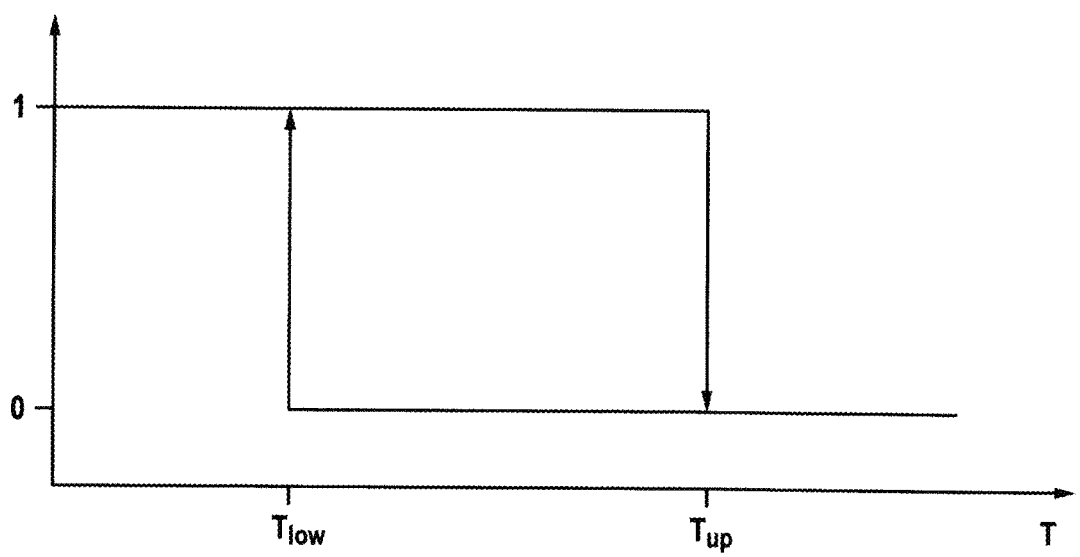
FIG. 3 shows a diagram which illustrates a method of activating and deactivating an electric heating wire according to an exemplary embodiment of the invention.

Operating the electric heating wire 20 with a hysteresis, as it has been described before, is schematically illustrated in the diagram depicted in FIG. 3. In said diagram, the temperature T, detected by the at least one temperature sensor 26, is plotted on the horizontal axis, and the switching state (0="off", 1="on") is plotted on the vertical axis.

In an alternative embodiment, the controller 28 may include a timer 30, which is started when the electric heating wire 20 is activated, and the electric heating wire 20 may be deactivated after a predefined time period has expired.

Figure 4:
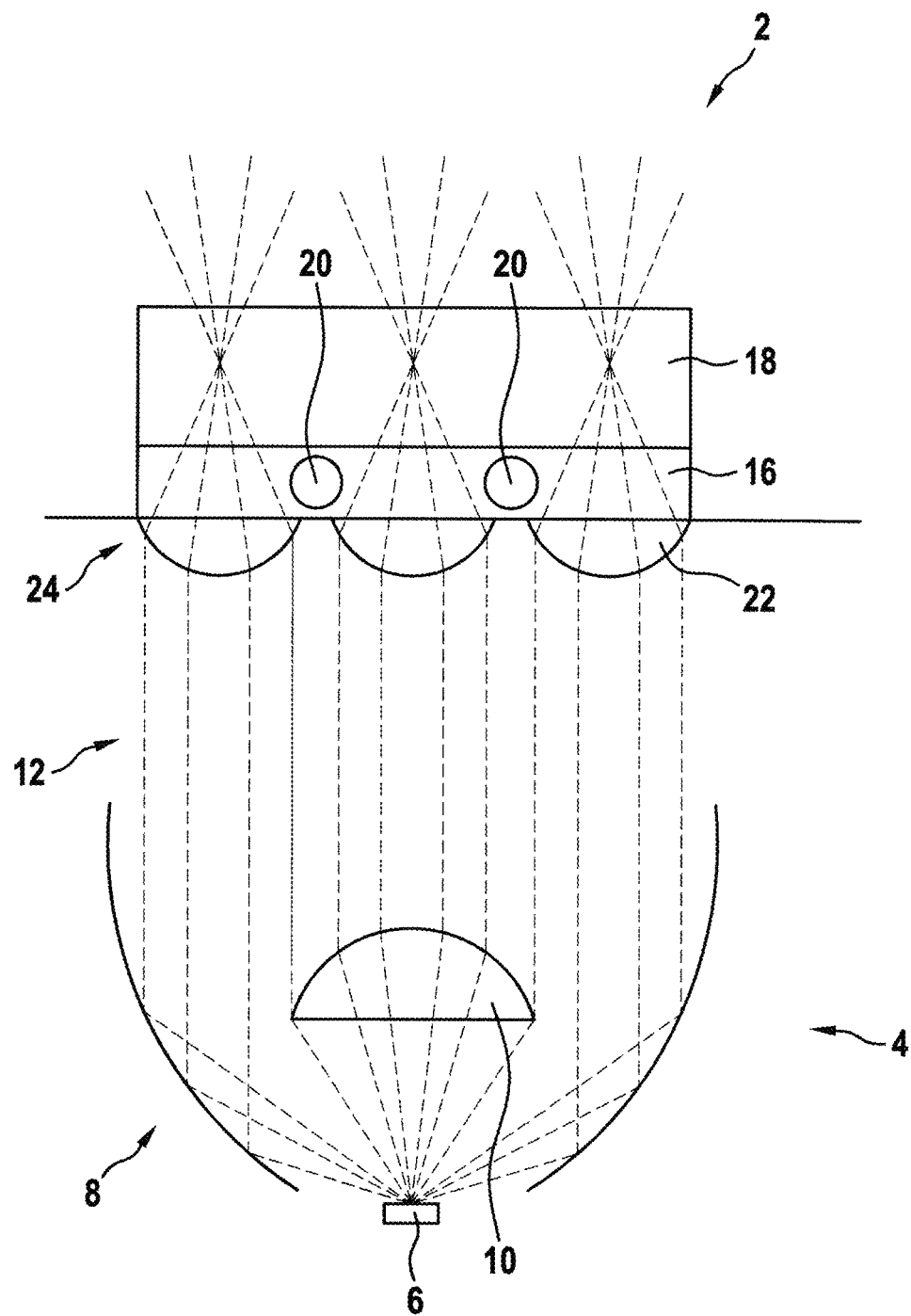
FIG. 4 shows a schematic cross-sectional view of a light emission unit of an aircraft headlight according to another exemplary embodiment of the invention.

FIG. 4 depicts a schematic cross-sectional view of a light emission unit 4 of an aircraft headlight 2 according to another exemplary embodiment of the invention.

The components of the light emission unit 4 depicted in FIG. 4, which are analogous to the respective components of the embodiment depicted in FIG. 2, are denoted with the same reference numerals and will not be discussed in detail again. Reference is made to their description above.

In the embodiment depicted in FIG. 4, at least one additional optical element 22, such as at least one additional lens 22, is formed on or within the light transmissive cover 14. In the embodiment depicted in FIG. 4, the at least one additional optical element 22 is in particular formed on the side of the light transmissive cover 14 facing the at least one light source 6.

The at least one additional optical element 22 may be formed by or within the first layer 16 facing the at least one light source 6. Alternatively, the at least one additional optical element 22 may be formed by or within a third layer 24, which is formed on a side of the first layer 16 facing the at least one light source 6. In such a configuration, the first layer 16 is sandwiched between the previously mentioned second (outer) layer 18 and the additional third layer 24, as it is shown in FIG. 4.

In a further embodiment, which is not explicitly shown in the figures, at least one optical element, in particular at least one lens, may be formed in or on the second (outer) layer 18.

With the at least one additional optical element 22, light may be directed around the at least one heating wire 20. This may provide for more volume that can be used by the at least one heating wire 22, without blocking light from the light unit 4. In this way, it may be possible to pass more current through the at least one heating wire 20 and to heat the light transmissive cover 14 more quickly, without risking localized overheating. The embodiment of FIG. 4 may be particularly suitable for such headlights that do not necessarily require a highly collimated light output. In particular, the aircraft headlight of FIG. 4 may be more suitable for taxi and runway turn-off lights, while the aircraft headlight of FIG. 2 may be more suitable for landing and take-off lights.

Figure 5:
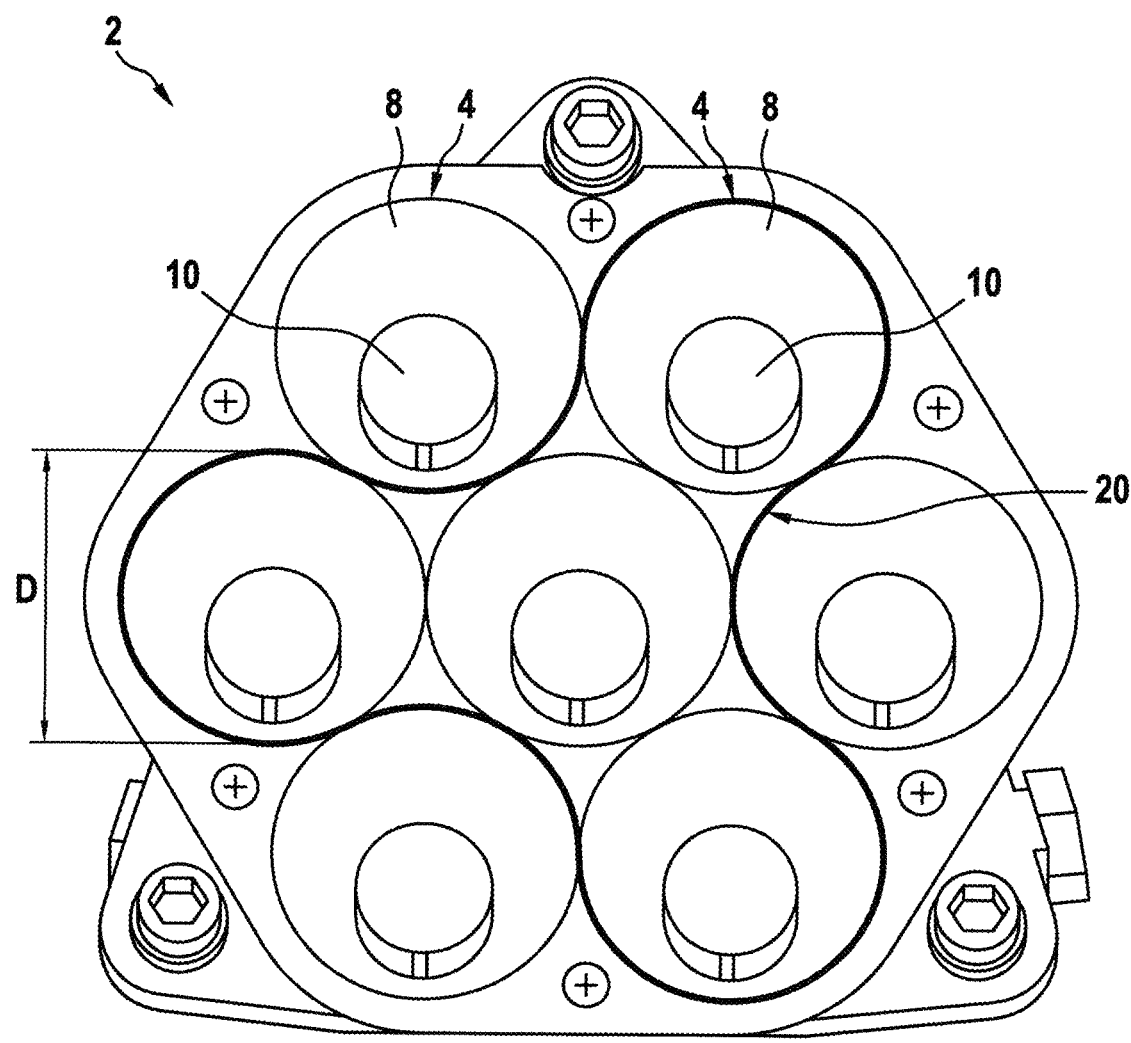
FIG. 5 shows a front view of an aircraft headlight according to an embodiment of the invention.

FIG. 5 depicts a front view of an aircraft headlight 2 according to an exemplary embodiment of the invention, comprising seven light emission units 4, which are arranged next or each other in a honeycomb structure.

The number of seven light emission units 4, as they are depicted in FIG. 5, is only exemplary. An aircraft headlight 2 according to an embodiment of the invention may comprise any other number of light emission units 4 as well.

Each of the light emission units 4 depicted in FIG. 5 comprise a light source 6, a reflector 8, and a lens 10, as it is schematically depicted in FIG. 2. The light sources 6 are not visible in FIG. 5, as they are covered by the lenses 10. Being transparent, the light transmissive cover 14 is also not visible in FIG. 5.

The maximum diameter D of each reflector 8 of the light emission units 4 may be between 10 mm and 60 mm.

FIG. 5 further shows the extension of the electric heating wire 20. In the embodiment depicted in FIG. 5, the electric heating wire 20 extends along a projection of at least a portion the outer perimeter of each of the reflectors 8 onto the light transmissive cover 14. The electric heating wire 20 in particular extends along portions of the projections of the interfaces between adjacent light emission units 4, which are formed by border portions of adjacent reflectors 8, onto the light transmissive cover 14.

In such a configuration, as it is depicted in FIG. 5, the electric heating wire 20 does not extend across the central light emitting portions of the reflectors 8, i.e. the portions of the reflectors 8 from which the targeted light output 12 is emitted. As a result, the electric heating wire 20 may have a very low/substantially no impact on the targeted light output 12. The targeted light output 12, which is emitted from the aircraft headlight 2, may be not deteriorated or deteriorated only to a very small extent by the electric heating wire 20.

The at least one electric heating wire 20 may have a thickness in the range from 0.05 mm to 0.5 mm. The at least one electric heating wire 20 may in particular have a thickness in the range from 0.1 mm to 0.3 mm. The at least one electric heating wire 20 may more particularly have a thickness in the range from 0.15 mm to 0.25 mm.

In the embodiment depicted in FIG. 5, a single electric heating wire 20 extends along the outer perimeter of the reflectors 8. In an alternative configuration, which is not explicitly depicted in the Figures, the aircraft headlight 2 may comprise a plurality of electric heating wires 20, and each electric heating wire 20 may extend along at least a portion of the outer perimeter of one or more of the reflectors 8.

In a configuration comprising a plurality of electric heating wires 20, the electric heating wires 20 may be electrically coupled serially or parallel to each other with the controller 28.

Figure 6:
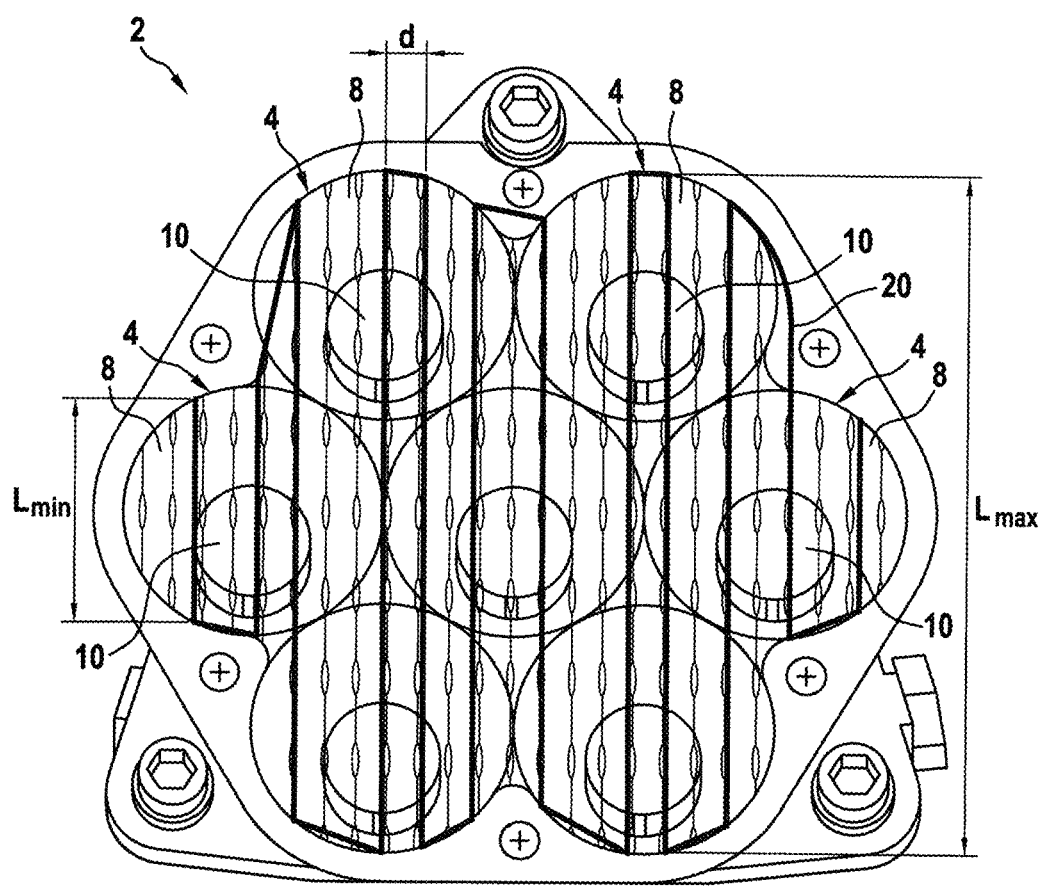
FIG. 6 shows a front view of an aircraft headlight according to another embodiment of the invention.

FIG. 6 shows a front view of an aircraft headlight 2 according to another exemplary embodiment of the invention. The components of the aircraft headlight 2, which are analogous to the respective components of the aircraft headlight 2 depicted in FIG. 5, are denoted with the same reference numerals and will not be discussed in detail again. Reference is made to their description above.

The exemplary embodiment depicted in FIG. 6 differs from the embodiment depicted in FIG. 5 in that the electric heating wire 20 does no predominantly extend along the perimeters of the reflectors 8. Instead, the electric heating wire 20 extends in a meander shaped path across the light emission portions of the light emission units 4.

The meander shaped path in particular comprises linear long portions 20a, which extend in a vertical direction in the orientation of the aircraft headlight 2 depicted in FIG. 6, and short portions 20b, extending between adjacent long portions 20a, respectively. The short portions 20b may be linear portions extending basically orthogonally to the long portions 20a. The short portions 20b may also be curved portions extending along projections of the outer perimeter of one of the reflectors 8.

The long portions may have a minimum length $L_{min}$ between 30 mm and 60 mm, and/or a maximum length $L_{max}$ between 90 mm and 180 mm.

The distance d between adjacent long portions may be between 20 mm and 50 mm.

The spatial orientation of the long and short portions of the electric heating wire 20 depicted in FIG. 6 is only exemplary. The portions of the electric heating wire 20 may be arranged in different orientations, in particular in different angular orientations with respect to the light emission units 4.

As compared to the exemplary embodiment of FIG. 5, the electric heating wire 20 of the exemplary embodiment of FIG. 6 may block more light. The aircraft headlight 2 of the exemplary embodiment of FIG. 6 may therefore be more suitable for applications where the total light output is not the prime concern and/or where mainly non-collimated light is blocked by the electric heating wire 20. For example, additional lenses, similar to the ones discussed with respect to FIG. 4 or embodied in a different way, could be arranged for spreading light, in order to route the light around the electric heating wire 20 and/or to achieve that mainly non-collimated light is blocked by the electric heating wire 20. In this way, an efficient heating of the light transmissive cover 14 may be achieved, while a collimated portion of the light output, directed into a prime operating direction of the aircraft headlight 2 is not affected or only affected to a small extent. The aircraft headlight 2 according to the exemplary embodiment of FIG. 6 may be well-suited for being used as a taxi light or runway turn-off light, with these lights often providing a more widely spread light output than landing or take-off lights.

Instead of a single electric heating wire 20, which extends over all light emission units 4, as it is depicted in FIG. 6, an aircraft headlight 2 according to an exemplary embodiment of the invention may comprise a plurality of electric heating wires 20.

In a configuration, which comprises a plurality of electric heating wires 20, each electric heating wire 20 may extend over a subset of the light emission units 4, respectively. Alternatively, the plurality of electric heating wires 20 may be arranged in a nested configuration, in which each of the electric heating wires 20 extends over at least a plurality of light emission units 4. Each of the electric heating wires 20 may in particular extend over all light emission units 4.

In a configuration comprising a plurality of electric heating wires 20, the electric heating wires 20 may be electrically coupled serially or parallel to each other with respect to the controller 28.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft headlight comprising:
   a plurality of light emission units arranged in a side-by-side configuration, each of the plurality of light emission units comprising a unit-specific light source and a unit-specific reflector, with each unit-specific reflector comprising a respective central light emitting portion from which a targeted light output of the respective light emission unit is emitted; and
   a light transmissive cover, at least partially covering the plurality of light emission units;
   wherein the light transmissive cover comprises:
   a first layer made of a first material;
   a second layer made of a second material, which differs from the first material; and
   at least one electric heating wire for heating the light transmissive cover by passing an electric current through the electric heating wire, wherein the at least one electric heating wire is embedded into the first layer;
   wherein outer perimeters of the unit-specific reflectors of the plurality of light emission units have substantially circular projections onto the light transmissive cover; and
   wherein the at least one electric heating wire does not extend across the central light emitting portions of the unit-specific reflectors of the plurality of light emission units, and wherein the at least one electric heating wire at least partially extends along the substantially circular projections of the outer perimeters of the unit-specific reflectors and along projections of the interfaces between adjacent light emission units onto the light transmissive.

2. An aircraft headlight according to claim 1, wherein
the first layer faces the unit-specific light source of each of the plurality of light emission units; and
the second layer faces away from the unit-specific light source of each of the plurality of light emission units.

3. An aircraft headlight according to claim 1,
wherein the first layer is attached to the second layer, or
wherein the first layer is made by casting or overmolding the first material around the at least one electric heating wire.

4. An aircraft headlight according to claim 1, wherein the first and second materials have at least one of the following properties:
the first material has a higher thermal conductivity than the second material, and/or
the first material is softer than the second material.

5. An aircraft headlight according to claim 1,
wherein the first material comprises at least one of silicone and polycarbonate; or
wherein the second material comprises at least one of glass and plastic.

6. An aircraft headlight according to claim 1, wherein at least one of the plurality of light emission units further comprises:
a lens for forming a targeted light output from the light emitted by the unit-specific light source of the respective light emission unit.

7. An aircraft headlight according to claim 1, wherein the light transmissive cover comprises a third layer, wherein the first layer is sandwiched between the second and third layers, and wherein at least one optical element is formed within the third layer.

8. An aircraft headlight according to claim 6, wherein the at least one electric heating wire at least partially extends along an outer periphery of a projection of the at least one lens onto the light transmissive cover.

9. An aircraft headlight according to claim 1, further comprising:
at least one temperature sensor for detecting a temperature (T) at or within the aircraft headlight; and
a controller for selectively activating and/or deactivating an electric current, which passes through the at least one electric heating wire, based on the temperature (T) detected by the at least one temperature sensor.

10. An aircraft headlight according to claim 1, wherein the aircraft headlight is an aircraft landing light, an aircraft take-off light, an aircraft taxi light, an aircraft runway turn-off light, or a multi-functional aircraft light providing the functionalities of at least two of an aircraft landing light, an aircraft take-off light, an aircraft taxi light, and an aircraft runway turn-off light.

11. An Aircraft comprising:
at least one aircraft headlight according to claim 1.

12. A method of heating the light transmissive cover of an aircraft headlight according to claim 1, the method comprising passing an electric current through the at least one electric heating wire.

13. A method according to claim 12, wherein the method includes:
detecting a temperature (T) at or within the aircraft headlight;
selectively activating and deactivating the electric current, passing through the at least one electric heating wire, based on the detected temperature (T),
activating the electric current passing through the at least one electric heating wire when the detected temperature (T) is below a predefined lower threshold, for example a predefined lower threshold ($T_{low}$) of between 0° C. and +5° C.; or
deactivating the electric current, passing through the at least one electric heating wire, when the detected temperature (T) exceeds a predefined upper threshold, for example a predefined upper threshold ($T_{up}$) of between +10° C. and +30° C.

14. The aircraft according to claim 11,
wherein the at least one aircraft headlight is mounted to a fuselage, or to a landing gear, or to a wing of the aircraft.

15. The aircraft according to claim 11,
wherein the at least one aircraft headlight is mounted to a wing root of the aircraft.

* * * * *